United States Patent [19]
Yoshida

[11] Patent Number: 5,120,434
[45] Date of Patent: Jun. 9, 1992

[54] FILTER FOR INTANK PUMP

[75] Inventor: Shigeru Yoshida, Obu, Japan

[73] Assignee: Aisan Kogyo Kabushiki Kaisha, Obu, Japan

[21] Appl. No.: 682,455

[22] Filed: Apr. 9, 1991

[30] Foreign Application Priority Data

May 30, 1990 [JP] Japan ................... 2-57032[U]

[51] Int. Cl.⁵ .................... E03B 11/00; B01D 35/00
[52] U.S. Cl. ................... 210/172; 210/232; 210/350; 210/416.4; 210/455; 210/459; 210/460
[58] Field of Search ............ 210/459, 231, 232, 416.1, 210/416.4, 435, 441, 455, 172, 460; 415/213.1

[56] References Cited

U.S. PATENT DOCUMENTS

| | | | |
|---|---|---|---|
| 3,826,372 | 7/1974 | Bell | 210/460 |
| 3,900,397 | 8/1975 | Bell | 210/416.4 |
| 4,312,753 | 1/1982 | Bell | 210/416.4 |
| 4,420,396 | 12/1983 | Yamamoto et al. | 210/232 |
| 4,617,121 | 10/1986 | Yokoyama | 210/416.4 |
| 4,783,260 | 11/1988 | Kurihara | 210/416.4 |
| 4,966,522 | 10/1990 | Koyama | 210/172 |

Primary Examiner—W. Gary Jones
Assistant Examiner—Ana M. Fortuna
Attorney, Agent, or Firm—Dennison, Meserole, Pollack & Scheiner

[57] ABSTRACT

A filter adapted to be connected to a suction hole of an intank pump provided in a tank for storing a liquid and adapted to pump the liquid out of the tank. The filter includes a mesh bag and an elastic frame surrounded by the mesh bag for elastically pressing a lower portion of the mesh bag against a bottom inner surface of the tank. The elastic frame is formed with a flat plate adapted to uniformly press the lower portion of the mesh bag against the bottom inner surface of the tank. Accordingly, local wearing of the mesh bag due to the pressure applied thereto by the frame can be prevented.

10 Claims, 3 Drawing Sheets

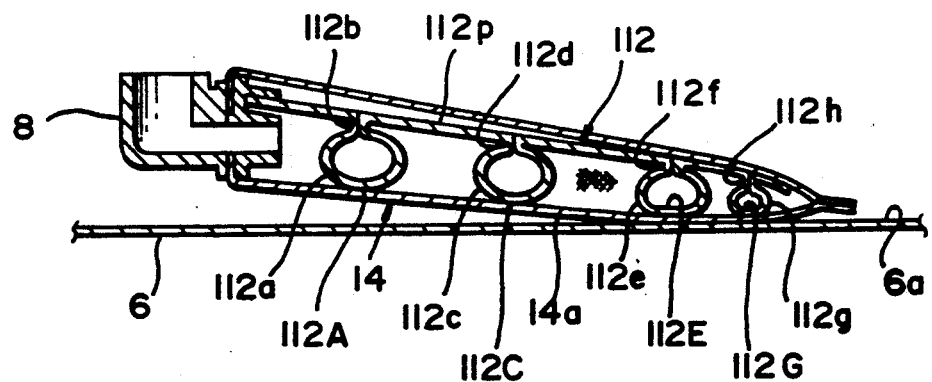
FIG. 6
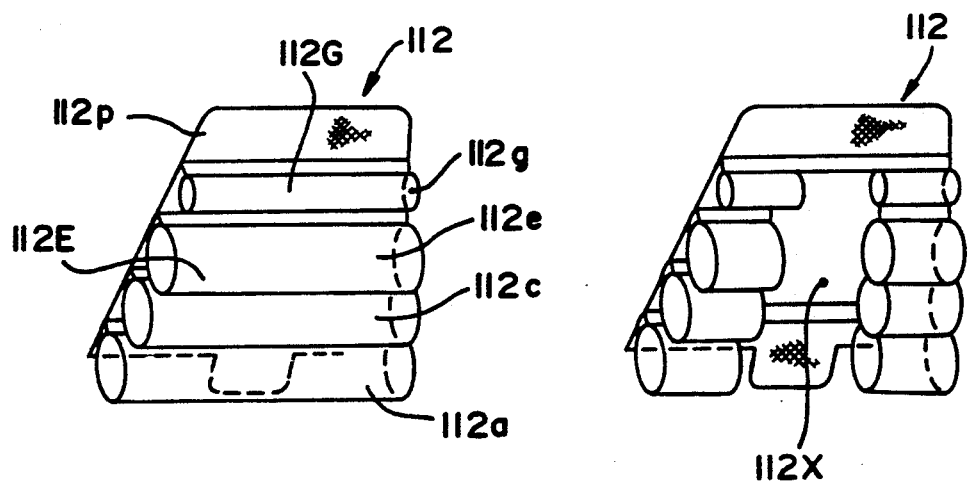
FIG. 7
FIG. 8
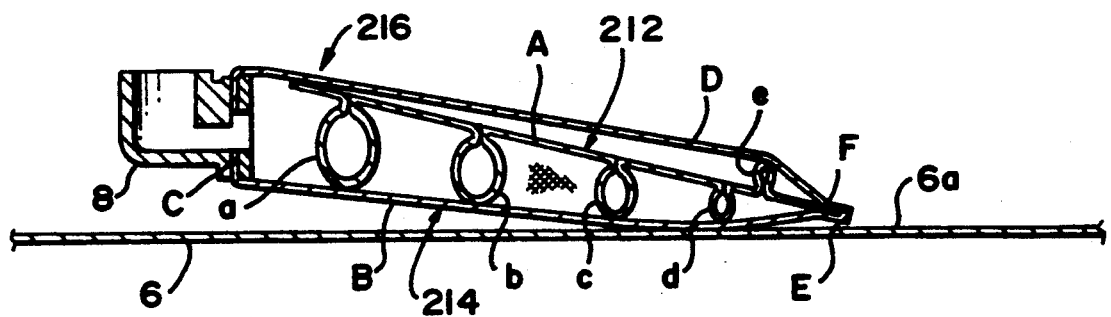
FIG. 9

FILTER FOR INTANK PUMP

BACKGROUND OF THE INVENTION

The present invention relates to an improvement in a filter adapted to be connected to a suction hole of an intank pump provided in a tank for storing a liquid, so as to prevent suction of a foreign matter in the liquid.

In such a filter for use with the intank pump, the filter must be kept in abutment against a bottom inner surface of the tank, so as to minimize a residual amount of the liquid not to be sucked into the pump. To meet the requirement, there is disclosed in Japanese Utility Model Laid-open Publication No. 62-203977, for example, a structure such that an elastic member is provided in the filter to press a mesh bag of the filter against the bottom inner surface of the tank.

However, as the elastic member in this structure is formed from a torsion spring, a surface area of the mesh bag to be pressed by the torsion spring is small, and a pressure per unit area applied to the mesh bag by the torsion spring becomes large. In this circumstance, when the pump and the tank are vibrated as in the case that they are mounted on an automobile or the like, the mesh bag is locally worn by the torsion spring due to a large pressure. In the worst case, there is a possibility of breakage of the mesh bag.

The above problem may be cleared by reducing a spring force of the torsion spring. However, since the torsion spring requires to have a spring force enough to stably maintain the abutment of the mesh bag against the bottom inner surface of the tank even if a mounting level of the pump in the tank is somewhat varied, the spring force of the torsion spring cannot be so small. Thus, the local wearing of the mesh bag due to the pressure applied thereto by the torsion spring cannot be avoided.

SUMMARY OF THE INVENTION

It is accordingly an object of the present invention to provide a filter for an intank pump which can prevent the local wearing of the mesh bag due to the pressure applied thereto by the elastic member.

According to the present invention, there is provided a filter adapted to be connected to a suction hole of an intank pump provided in a tank for storing a liquid and adapted to pump said liquid out of said tank, said filter comprising a mesh bag and an elastic frame surrounded by said mesh bag for elastically pressing a lower portion of said mesh bag against a bottom inner surface of said tank, said elastic frame being formed with a flat plate adapted to uniformly press the lower portion of said mesh bag against the bottom inner surface of said tank.

With this construction, the lower portion of the mesh bag is not locally pressed by the elastic frame against the bottom inner surface of the tank, but is uniformly pressed by the flat plate of the elastic frame. Accordingly, even when the pump and the tank are vibrated, the local wearing of the mesh bag due to the pressure applied thereto by the elastic frame can be effectively suppressed.

In the case that the flat plate is formed at an outer periphery thereof with a curved surface, the frame can be easily slipped relative to the mesh bag to thereby more effectively suppress the local wearing of the mesh bag.

In the case that the frame is formed from a flexible member, the pressure applied to the mesh bag can be prevented from becoming excess because of variations in mounting level of the pump in the tank, thereby more effectively suppressing the local wearing of the mesh bag.

The invention will be more fully understood from the following detailed description and appended claims when taken with the drawings.

BRIEF DESCRIPTION OF THE DRAWINGS

FIG. 6 is a vertical sectional view of the filter according to a third preferred embodiment of the present invention;

FIG. 7 is a perspective view of a frame of the filter shown in FIG. 6;

FIG. 8 is a view similar to FIG. 7, showing a modification of the third preferred embodiment; and FIG. 9 is a vertical sectional view of the filter according to a fourth preferred embodiment of the present invention.

DETAILED DESCRIPTION OF THE PREFERRED EMBODIMENTS

There will now be described some preferred embodiments of the present invention with reference to the drawings.

FIRST PREFERRED EMBODIMENT

Figure 1:
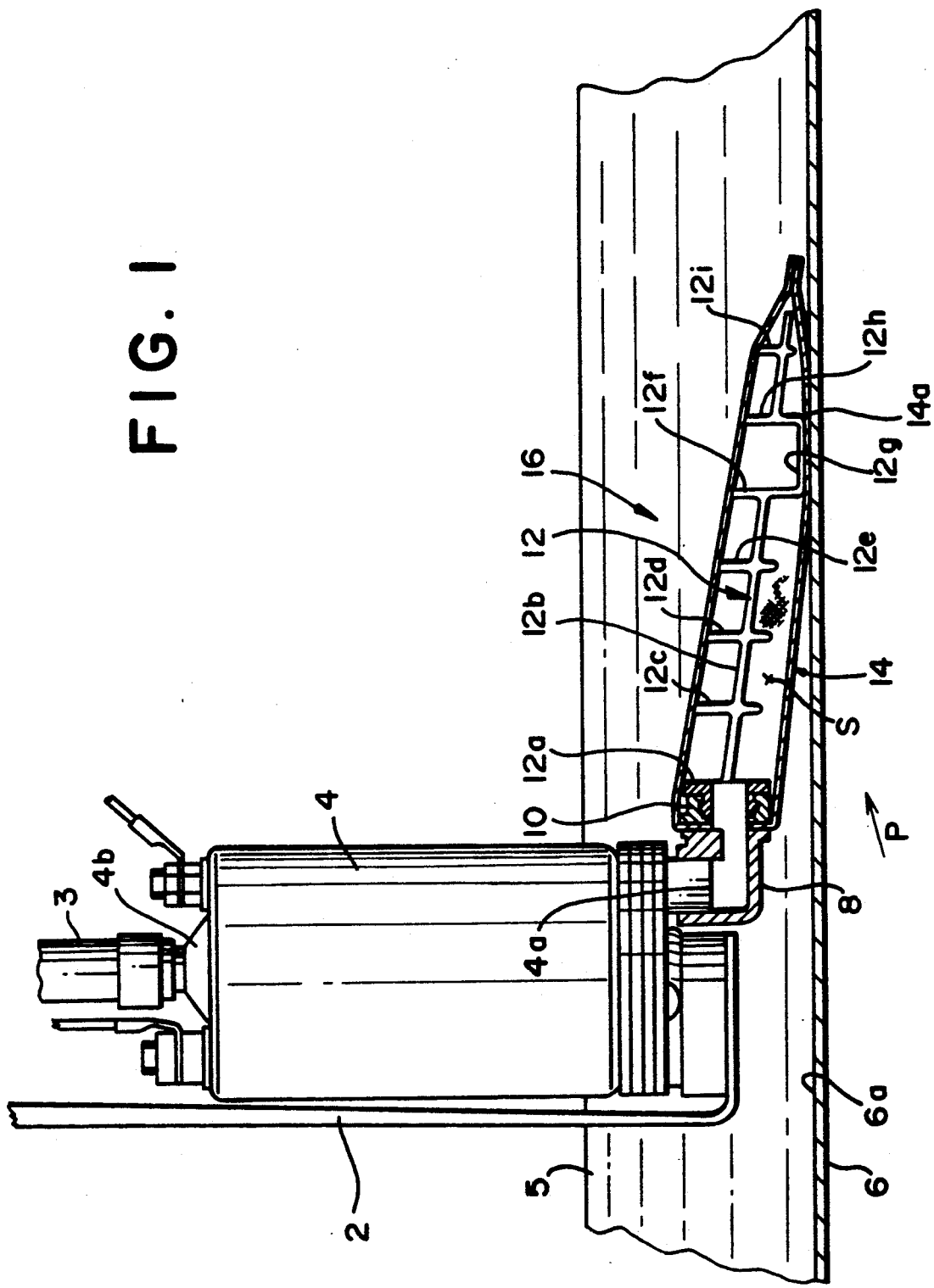
FIG. 1 is a vertical sectional view of the filter according to a first preferred embodiment of the present invention under the condition where the filter is connected to an intank pump in a fuel tank.
Figure 2:
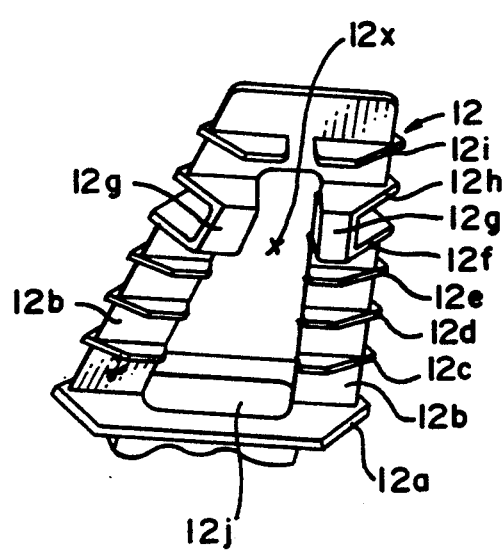
FIG. 2 is a perspective view of a frame of the filter shown in FIG. 1.

A first preferred embodiment of the present invention is shown in FIGS. 1 and 2.

Referring to FIG. 1, reference numeral 6 designates a fuel tank for an automobile (not shown), a part of the fuel tank 6 being shown. A bracket 2 is fixed at its upper end (not shown) to the fuel tank 6. A motor-driven fuel pump 4 is provided in the fuel tank 6, and is fixed to a lower end of the bracket 2. The motor-driven fuel pump 4 will be hereinafter referred to as an intank pump. The intank pump 4 has a fuel inlet 4a for sucking a fuel 5 stored in the fuel tank 6, and has a fuel outlet 4b for discharging the fuel 5 through a fuel pipe 3 to an engine (not shown) outside of the fuel tank 6. A filter 16 is fixedly connected through a connector 8 and a joint member 10 to the fuel inlet 4a of the intank pump 4. The filter 16 is primarily composed of a frame 12 and a mesh bag 14 surrounding the frame 12.

Referring to FIG. 2 which shows a perspective view of the frame 12 as viewed in a direction depicted by an arrow P in FIG. 1, the frame 12 is integrally formed with a base plate 12a having an opening 12j and adapted to be fixedly connected to the joint member 10, a pair of slant plates 12b extending obliquely downwardly from the base plate 12a on opposite sides of the opening 12j and integrally connected at free ends opposite to the base plate 12b, and a plurality of vertical plates 12c, 12d, 12e, 12f, 12h and 12i projecting from each slant plate 12b and arranged at substantially equal intervals. A pair of flat plates 12g are so formed to connect the vertical plates 12f and 12h at their lower ends. There is defined an opening 12x between the two slant plates 12b so as to be continued to the opening 12j of the base plate 12a.

The frame 12 is formed of a synthetic resin having an elasticity. The mesh bag 14 is also formed of a synthetic resin having a flexibility. The mesh bag 14 is fixed at its base end by sandwiching the same between the joint member 10 and the connector 8. The joint member 10 is fixed to the connector 8 by ultrasonic welding. The mesh bag 14 is formed by welding outer peripheries of two mesh members under the condition where the frame 12 is wrapped in the mesh bag 14.

As shown in FIG. 1, the filter 16 extends obliquely downwardly from the connector 8 mounted to the fuel inlet 4a of the intank pump 4, and the flat plates 12g formed between the vertical plates 12f and 12h are so disposed as to press a bottom inner surface 6a of the fuel tank 6 through a lower portion of the mesh bag 14. As the frame 12 is elastically deformable, the lower portion 14a of the mesh bag 14 is uniformly pressed by the flat plates 12g against the bottom inner surface 6a even if a mounting level of the pump 4 is somewhat varied.

If the flat plates 12g are not formed, the lower portion 14a of the mesh bag 14 would be locally pressed by the lower ends of the vertical plates 12f and 12h against the bottom inner surface 6a of the fuel tank 6. However, according to the present invention, since the flat plates 12g are formed, the lower portion 14a of the mesh bag 14 is uniformly pressed by the flat plates 12g. That is, a pressure (per unit area) to be applied to the lower portion 14a of the mesh bag 14 by the frame 12 can be largely reduced owing to the flat plates 12g. Accordingly, even when the pump 4 or the fuel tank 6 is vibrated, a frictional force to be generated between the bottom inner surface 6a of the fuel tank 6 and the lower portion 14a of the mesh bag 14 can be largely reduced to thereby effectively suppress local wearing of the mesh bag 14.

While each flat plate 12g has a flat bottom surface contacting with an inner surface of the lower portion 14a of the mesh bag 14, it may have a downward gentle curved surface contacting with the inner surface of the lower portion 14a of the mesh bag 14. Further, as apparent from FIG. 1, each flat plate 12 is located in the vicinity of a free end of the elastic frame 12, and a space S is defined between each flat plate 12 and a base end of the elastic frame 12 connected to the joint member 10 so as to separate an intermediate portion of the elastic frame 12 from the lower portion 14a of the mesh bag 14. With this construction, local wearing of the lower portion 14a of the mesh bag 14 due to abutment of the vertical plates 12c, 12d and 12e against the lower portion 14a can be prevented even if variation of the mounting position of the tank is generated.

Figure 3:
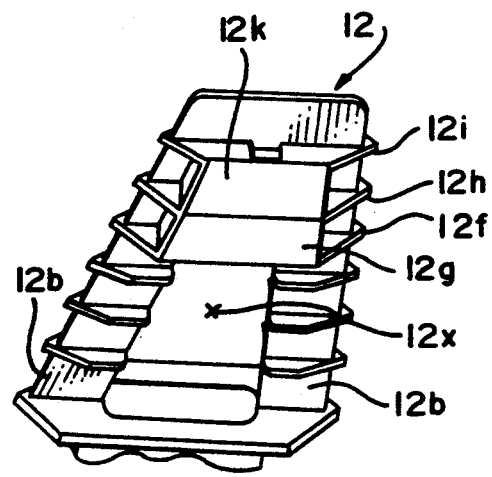
FIG. 3 is a view similar to FIG. 2, showing a modification of the first preferred embodiment.

Referring to FIG. 3 which shows a modification of the first preferred embodiment shown in FIGS. 1 and 2, a first flat plate 12g is so formed as to connect the vertical plates 12f and 12h of each slant plate 12b and bridge those formed on the two slant plates 12b. In addition, a second flat plate 12k is so formed as to connect the vertical plates 12h and 12i of each slant plate 12b and bridge those formed on the two slant plates 12b. With this construction, even when the variations of the mounting level of the pump 4 becomes larger than those in the case of FIG. 1, the lower portion 14a of the mesh bag 14 can be reliably pressed by the flat plates 12g and 12k against the bottom inner surface 6a of the fuel tank 6, and the pressure to be applied to the lower portion 14a of the mesh bag 14 can be reduced.

SECOND PREFERRED EMBODIMENT

Figure 4:
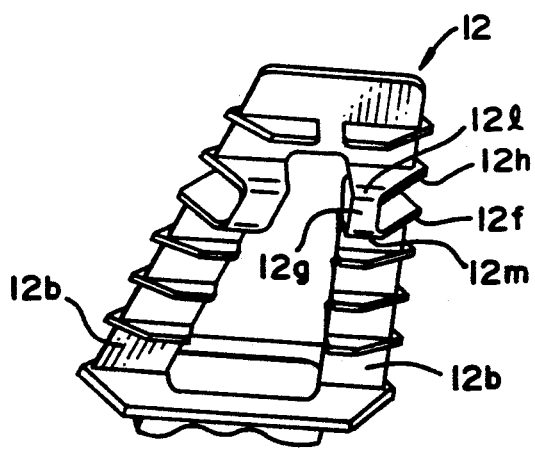
FIG. 4 is a view similar to FIG. 2, showing a second preferred embodiment of the present invention.

Referring to FIG. 4 which shows a second preferred embodiment of the present invention, the frame 12 shown in FIG. 2 is modified such that a corner portion 12m between the vertical plate 12f and the flat plate 12g on each slant plate 12b side is curved. Similarly, a corner portion 12l between the vertical plate 12h and the flat plate 12g on each flat plate 12b side.

With this construction, even when the pump 4 and the fuel tank 6 are relatively moved by external vibration, the frame 12 can be slipped easily relative to the mesh bag 14, and accordingly the mesh bag 14 is hardly slipped relative to the fuel tank 6. Therefore, wearing of the mesh bag 14 due to the slip on the bottom inner surface 6a of the fuel tank 6 can be greatly prevented. Although the frame 12 is slipped on the lower portion 14a of the mesh bag 14, there is no possibility of wearing of the mesh bag 14 because both the frame 12 and the mesh bag 14 are formed of a synthetic resin having a low coefficient of friction. Thus, the local wearing of the mesh bag 14 can be more effectively suppressed for the above reason plus the effect of the first preferred embodiment.

Figure 5:
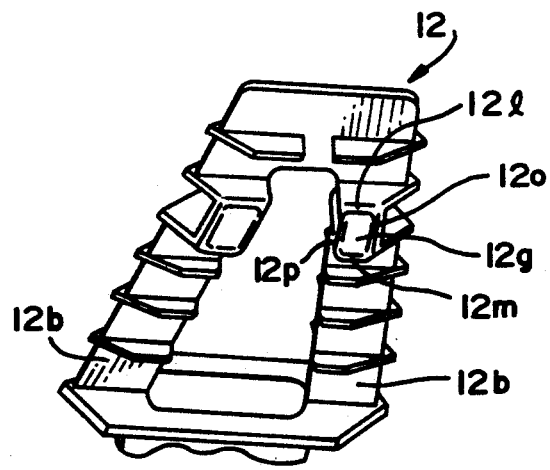
FIG. 5 is a view similar to FIG. 3, showing a modification of the second preferred embodiment.

Referring to FIG. 5 which shows a modification of the second preferred embodiment shown in FIG. 4, opposite side edges 12o and 12p of the flat plate 12g on each slant plate 12b side are curved in addition to the curved formation of the corner portions 12l and 12m. With this construction, the frame 12 can be more easily slipped relative to the mesh bag 14.

THIRD PREFERRED EMBODIMENT

Referring to FIGS. 6 and 7 which show a third preferred embodiment of the present invention, reference numeral 112 designates a frame formed from a mesh member of a synthetic resin having an elasticity and a flexibility. The frame 112 is primarily composed of a planar portion 112p and a plurality of loop portions 112a, 112c, 112e and 112g integrally formed with the planar portion 112p. The loop portions 112a, 112c, 112e and 112g are so formed as to depend from the planar portion 112p in such a manner that upper ends 112b, 112d, 112f and 112h are welded, and that lower ends 112A, 112C, 112E and 112G contact the inner surface of the lower portion 14a of the mesh bag 14.

Under the condition shown in FIG. 6, the loop portions 112e and 112g are flexed so that the lower ends 112E and 112G are flattened to press the lower portion 14a of the mesh bag 14 against the bottom inner surface 6a of the fuel tank 6. Owing to such flattened lower ends 112E and 112G of the loop portions 112e and 112g, the pressure applied to the mesh bag 14 can be effectively reduced. Furthermore, as the flattened lower ends 112E and 112G pressing the lower portion 14a of the mesh bag 14 are formed from a mesh member, a reduction in filtration area of the mesh bag 14 is not caused by the flattened lower ends 112E and 112G, thus reducing a pressure loss of a suction pressure into the pump 4.

Referring to FIG. 8 showing a modification of the third preferred embodiment shown in FIG. 7, an opening 112X is formed by cutting middle portions of the loop portions 112a, 112c, 112e and 112g shown in FIG. 7, so as to further reduce the pressure loss of the suction pressure.

FOURTH PREFERRED EMBODIMENT

Referring to FIG. 9 showing a fourth preferred embodiment of the present invention, a filter 216 is formed from a single mesh member to construct a frame 212 and a mesh bag 214. The frame 212 is integrally formed with a planar portion A and a plurality of loop portions a, b, c, d and e. The mesh member is folded at a right end E of the planar portion A of the frame 212 to continue to a lower portion B of the mesh bag 214. The lower portion B is bent at a left end thereof to form a vertical portion C to be fixed to the connector 8. The vertical portion C is bent at an upper end thereof to form an upper portion D of the mesh bag 214. A final end F of the mesh bag 214 is welded to the folded end E of the frame 212. Although not shown, opposite side edges of the upper portion D and the lower portion B are also welded together. With this construction, as the filter is formed from a single mesh member, a manufacturing step can be simplified to thereby reduce a manufacturing cost.

Having thus described the preferred embodiments of the invention, it should be understood that numerous structural modifications and adaptations may be made without departing from the spirit of the invention.

What is claimed is:

1. A filter adapted to be connected to a suction hole of an intank pump provided in a tank for storing a liquid and adapted to pump said liquid out of said tank, said filter comprising a mesh bag and an elastic frame surrounded by said mesh bag for elastically pressing a lower portion of said mesh bag against a bottom inner surface of said tank, said elastic frame being formed with a flat plate having substantially a flat bottom surface contacting with an inner surface of said lower portion of said mesh bag over a generally planar area thereof and adapted to uniformly press the lower portion of said mesh bag against the bottom inner surface of said tank.

2. The filter as defined in claim 1, wherein said substantially flat bottom surface has a downward gentle curve thereto contacting with an inner surface of said lower portion of said mesh bag.

3. The filter as defined in claim 1, wherein said flat plate is located in the vicinity of a free end of said elastic frame, and a space is defined between said flat plate and a base end of said elastic frame connected to said suction hole so as to separate an intermediate portion of said elastic frame from said lower portion of said mesh bag.

4. The filter as defined in claim 1, wherein said flat plate is formed at an outer periphery thereof with a curved surface.

5. The filter as defined in claim 1, wherein said frame is formed from a flexible member.

6. The filter as defined in claim 1, wherein said frame and said mesh bag are formed of a resin material having a low coefficient of friction.

7. A filter adapted to be connected to a suction hole of an intank pump said liquid out of said tank, said filter adapted to pump said liquid out of said tank, said filter comprising a mesh bag and an elastic frame surrounded by said mesh bag for elastically pressing a lower portion of said mesh bag against a bottom inner surface of said tank, said elastic frame being formed from a flexible member, said flexible member comprising a mesh member formed with a loop portion adapted to flexibly and uniformly press the lower portion of said mesh bag against the bottom inner surface of said tank.

8. The filter as defined in claim 7 wherein said flexible member and said mesh bag are integrally formed from a single mesh member.

9. The filter as defined in claim 7 wherein said loop portion flattens to define plate means when flexibly pressing said mesh bag against the bottom inner surface of said tank.

10. A filter adapted to be connected to a suction hole of an intank pump provided in a tank for storing a liquid and adapted to pump said liquid out of said tank, said filter comprising a mesh bag and an elastic frame surrounded by said mesh bag for elastically pressing a lower portion of said mesh bag against a bottom inner surface of said tank, said elastic frame being formed with plate means adapted to uniformly press the lower portion of said mesh bag against the bottom inner surface of said tank, said frame an said mesh bag being integrally formed from a single mesh member.

* * * * *

UNITED STATES PATENT AND TRADEMARK OFFICE
CERTIFICATE OF CORRECTION

PATENT NO. : 5,120,434

DATED : June 9, 1992

INVENTOR(S) : SHIGERU YOSHIDA

It is certified that error appears in the above-identified patent and that said Letters Patent is hereby corrected as shown below:

```
Column 6, line 16, cancel "said liquid out of
said tank, said filter" and insert --provided
in a tank for storing a liquid and--.
```

Signed and Sealed this

Fourteenth Day of September, 1993

Attest:

BRUCE LEHMAN

*Attesting Officer*  *Commissioner of Patents and Trademarks*